United States Patent [19]

Hatano et al.

[11] Patent Number: 5,092,017
[45] Date of Patent: Mar. 3, 1992

[54] AUTOMOTIVE DOOR HINGE ASSEMBLY, BUSH EMPLOYED THEREIN AND METHOD FOR INSTALLING BUSH IN DOOR HINGE ASSEMBLY

[75] Inventors: Toshiaki Hatano; Yoichi Nakamura, both of Yokohama; Masayuki Kohama, Fujisawa; Kouichi Tsunoda, Fujisawa; Tadayoshi Umeki, Fujisawa; Takayuki Miyaji, Fujisawa; Kenjiro Makishima; Shigenori Taga, both of Yokohama, all of Japan

[73] Assignees: Ohi Seisakusho Co., Ltd., Yokohama; Oiles Corporation, Tokyo, both of Japan

[21] Appl. No.: 476,052

[22] Filed: Feb. 6, 1990

[30] Foreign Application Priority Data

Feb. 7, 1989 [JP] Japan ............................ 1-12663[U]
Feb. 7, 1989 [JP] Japan ............................ 1-26699

[51] Int. Cl.⁵ .......................... F16L 5/00; E05D 11/00
[52] U.S. Cl. ................................. 16/2; 16/342; 16/273; 16/381; 29/11
[58] Field of Search .................. 16/2, 342, 273, 381; 29/11

[56] References Cited

U.S. PATENT DOCUMENTS

| | | | |
|---|---|---|---|
| 2,675,283 | 4/1954 | Thomson . | |
| 3,562,847 | 2/1971 | Jemison | 16/2 |
| 4,535,196 | 8/1985 | Milne | 16/2 |
| 4,907,626 | 3/1990 | Mori | 16/2 |

FOREIGN PATENT DOCUMENTS

| | | |
|---|---|---|
| 16511 | 2/1978 | Australia . |
| 2052513 | 4/1972 | Fed. Rep. of Germany . |
| 2100164 | 7/1972 | Fed. Rep. of Germany . |
| 2432600 | 2/1980 | France . |
| 55-103371 | 7/1980 | Japan . |
| 1-79417 | 3/1989 | Japan . |
| 334248 | 1/1959 | Switzerland . |
| 2047327 | 11/1980 | United Kingdom . |
| 2106587 | 4/1983 | United Kingdom . |
| 2156898 | 10/1985 | United Kingdom . |
| 2176835 | 1/1987 | United Kingdom . |

Primary Examiner—Robert L. Spruill
Assistant Examiner—Carmine Cuda
Attorney, Agent, or Firm—Foley & Lardner

[57] ABSTRACT

A door hinge assembly is disclosed, which comprises a door hinge assembly for pivotally connecting a door to a fixed structure. The assembly comprises a first wing member secured to the fixed structure, the first wing member having first aligned bores formed therethrough; a second wing member secured to the door, the second wing member having second aligned bores formed therethrough, the first and second wing members being so arranged that all of the first and second aligned bores are aligned; a pivot shaft passing through the aligned first and second bores to pivotally connect the first and second wing members; plastically deformable bushes respectively disposed in the second bores while rotatably receiving therein the pivot shaft; a first structure for suppressing rotation of the pivot shaft relative to the first bores; and a second structure for suppressing rotation of the bushes relative to the second bores. Each bush includes a tubular part intimately and tightly received in the corresponding one of the second bores, and a first flange part integrally formed on one end of the tubular part and intimately contacting with one surface of the second wing member. The bush further includes a slit which extends axially throughout the tubular and flange parts thereby providing the bush with circumferentially opposed terminal end portions.

20 Claims, 5 Drawing Sheets

AUTOMOTIVE DOOR HINGE ASSEMBLY, BUSH EMPLOYED THEREIN AND METHOD FOR INSTALLING BUSH IN DOOR HINGE ASSEMBLY

BACKGROUND OF THE INVENTION

1. Field of the Invention

The present invention relates in general to door hinge assemblies, and more particularly, to automotive door hinge assemblies of a type which comprises one wing member secured to a vehicle body, the other wing member secured to a door, a pivot shaft pivotally connecting these two wing members and bushes disposed about the pivot shaft to smooth the pivotal movement between the two wing members. More specifically, the present invention is concerned with the door hinge assemblies of the above-mentioned type, bushes suitable for such door hinge assemblies and a method for installing the bushes in the door hinge assembly.

2. Description of the Prior Art

Hitherto, various types of door hinge assemblies have been proposed and put into practical use particularly in the field of motor vehicles. Some of them are of a type which comprises one wing member secured to the vehicle body, the other wing member secured to the vehicle door, a pivot shaft pivotally connecting these two wing members and bushes disposed about the pivot shaft to smooth the pivotal movement between the two wing members.

However, hitherto, the construction of the hinge assemblies and that of the bushes for such door hinge assemblies have been given little thought. In fact, for just convenience sake, the bushes employed in such door hinge assemblies are those of a type which is commonly used in light duty devices. Thus, due to the nature of such light duty bushes, frequent opening and closing movements of the door have sometimes induced severe abrasion of the bushes shortening the life of the door hinge assembly in which the bushes are employed. Such abrasion becomes much severe when the bushes are unstably installed in the hinge assembly. In fact, hitherto, it has been difficult or at least troublesome to install the bushes to their right positions without inducing a play of the same.

Japanese Utility Model First Provisional Publication 55-103371 shows bushes of a type whose outer surface is shaped polygonal. In use, the bush is fitted in a corresponding bore having the polygonal outer surface compressed, for the purpose of suppressing the undesirable play of the same relative to the bore. However, even the bushes of the Publication have failed to exhibit a satisfied result.

SUMMARY OF THE INVENTION

It is therefore an object of the present invention to provide a door hinge assembly which is free of the above-mentioned drawbacks.

According to first aspect of the present invention, there is provided a door hinge assembly whose life is prolonged as compared with the conventional door hinge assemblies. The assembly comprises a first wing member adapted to be secured to one of a door and a fixed structure, the first wing member having first aligned bores formed therethrough; a second wing member adapted to be secured to the other one of the door and the fixed structure, the second wing member having second aligned bores formed therethrough, the first and second wing members being so arranged that all of the first and second aligned bores are aligned; a pivot shaft passing through the aligned first and second bores to pivotally connect the first and second wing members; plastically deformable bushes respectively disposed in the second bores while rotatably receiving therein the pivot shaft; first means for suppressing rotation of the pivot shaft relative to the first bores; and second means for suppressing rotation of the bushes relative to the second bores.

According to a second aspect of the present invention, there is provided a plastically deformable bush which is suitable for prolonging the life of such door hinge assembly. The bush comprises a tubular part, the tubular part having an end portion tapered toward its free end; a flange part integrally formed on the other end of the tubular part; and means defining a slit which extends axially throughout the tubular and flange parts thereby to provide the bush with circumferentially opposed terminal end portions.

According to a third aspect of the present invention, there is provided a method for assuredly installing the bush to the right position in the door hinge assembly. The method comprised by steps (a) inserting the tubular part of the bush into one of the second bores from one side of the second wing member until the tapered end portion of the tubular part is exposed to the outside of the bore from the other side of the second wing member; (b) holding the bush in such a manner that the flange part is in intimate contact with one side surface of the second wing member; and (c) pressing the tapered end portion of the tubular part toward the flange part to plastically deform the same thereby to produce another flange part on the tubular part, which flange is in intimate contact with the other side surface of the second wing member.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
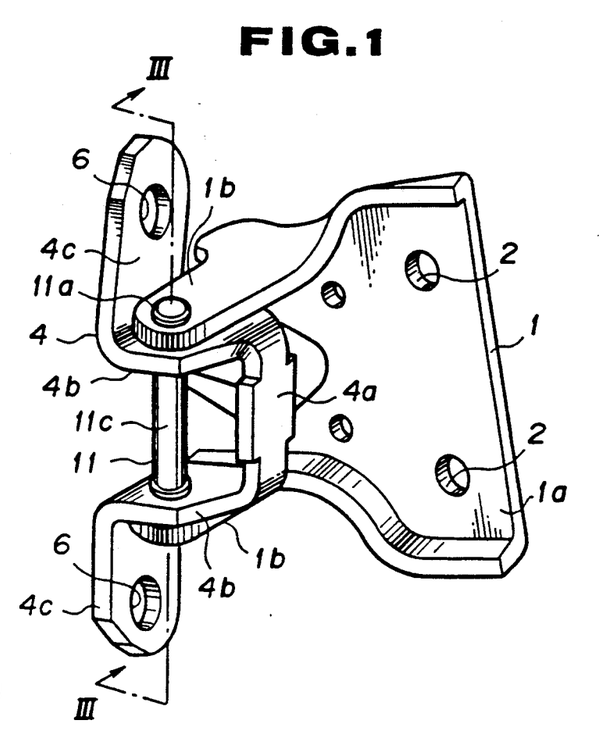
Fig 1 is a perspective view of a door hinge assembly which is a first embodiment of the present invention.

Referring to FIGS. 1 to 4 of the drawings, particularly FIG. 1, there is shown a door hinge assembly of a first embodiment of the present invention.

The door hinge assembly comprises one wing member 1 adapted to be secured to a vehicle body (namely, a pillar of the body). For ease of understanding, this wing member 1 will be referred to as "fixed wing member" hereinafter.

As is shown in FIG. 1, the fixed wing member 1 comprises a vertical base portion 1a which is to be bolted to the vehicle body, and two spaced horizontal supporting arms 1b and 1b which extend laterally from upper and lower ends of the base portion 1a. The supporting arms 1b and 1b have at their leading ends aligned bores 3 and 3 formed therethrough (see FIG. 3). For achieving the bolted connection, the base portion 1a is formed with openings 2 through which bolts (not shown) are inserted.

Pivotally connected to the fixed wing member 1 in an after-mentioned manner is another wing member 4 which will be referred to as "movable wing member" hereinafter for ease of understanding. The movable wing member 4 is secured through bolts (not shown) to the vehicle door.

Figure 2:
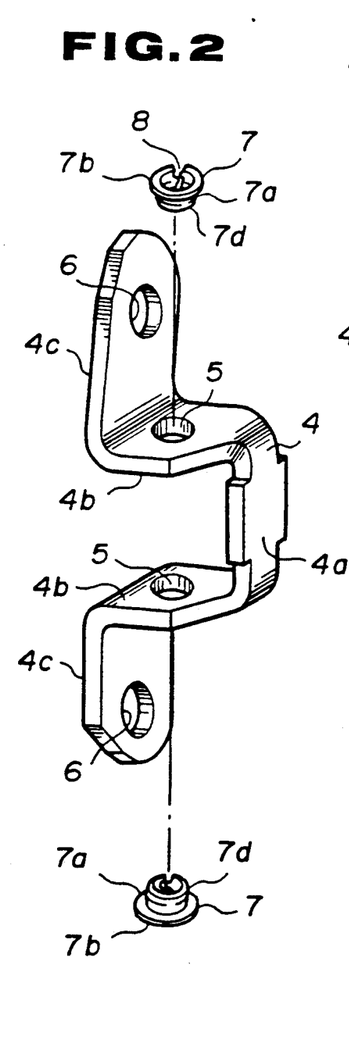
FIG. 2 is a perspective view showing one (movable) wing member and two bushes which are employed in the first embodiment.

As is seen from FIG. 2, the movable wing member 4 comprises a protruded middle portion (4a, 4b, 4b) which is put between the upper and lower supporting arms 1b and 1b of the above-mentioned fixed wing member 1. The movable wing member 4 further comprises upper and lower vertical base portions 4c and 4c which extend upward and downward from the protruded middle portion respectively.

The protruded middle portion comprises a vertical bridge part 4a, and upper and lower horizontal parts 4b and 4b which extend laterally from upper and lower ends of the vertical bridge part 4a and merge with the upper and lower vertical base portions 4c and 4c. The upper and lower horizontal parts 4b and 4b are respectively formed with aligned bores 5 and 5. The upper and lower vertical base portions 4c and 4c are formed with respective openings 6 and 6 through which bolts (not shown) are inserted to achieve a bolted connection of the movable wing member 4 to the vehicle door.

As is seen from FIG. 2, bushes 7 and 7 are respectively put in the bores 5 and 5 of the upper and lower horizontal parts 4b and 4b. The bushes in the bores are arranged in a mirror image manner, as shown.

For the reason which will be described hereinafter, when each bush 7 is finally set in the corresponding bore 5, there is no movement of the bush 7 relative to the bore 5.

The bush 7 is produced by stamping a plastically deformable material sheet which comprises an expanded metal mesh and a suitable plastic (for example, tetrafluoroethylene or the like) filling up the meshes of the metal mesh. The material sheet for the bush 7 is disclosed in Japanese Patent First Provisional Publication No. 64-79417.

Each bush 7 employed in the first embodiment comprises a tubular part 7a intimately received in the corresponding bore 5, a larger circular flange part 7b projected from the bore and intimately contacting the outer surface of the corresponding horizontal part 4b and a smaller circular flange part 7c projected from the bore 5 and intimately contacting the inner surface of the corresponding horizontal part 4b.

For the reason which will become apparent, the cylindrical inner surface of each bush 7 is made very smoothed.

Figure 4:
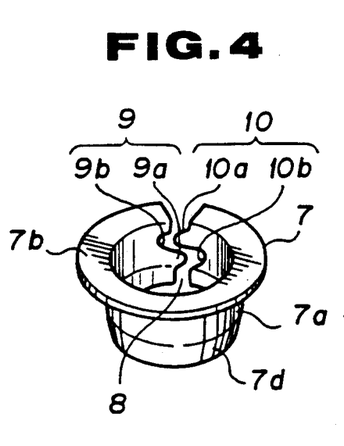
FIG. 4 is a perspective view of a bush employed in the door hinge assembly of the first embodiment.

As is best shown in FIG. 4, the bush 7 is formed with a slit 8 which extends generally axially to define circumferentially opposed terminal ends 9 and 10 of the bush 7. As shown, the opposed ends 9 and 10 are formed with mutually engageable wave-like portions, each including a rounded projection (or convex portion) 9a or 10a and a rounded recess (or concave portion) 9b or 10b. That is, when kept unstressed, the bush 7 assumes its expanded state as shown in FIG. 4, while, when stressed from the outside, the bush 7 completes its cylindrical shape having the wave-like opposed portions 9 and 10 neatly mated. This will be understood from FIG. 6.

Figure 5:
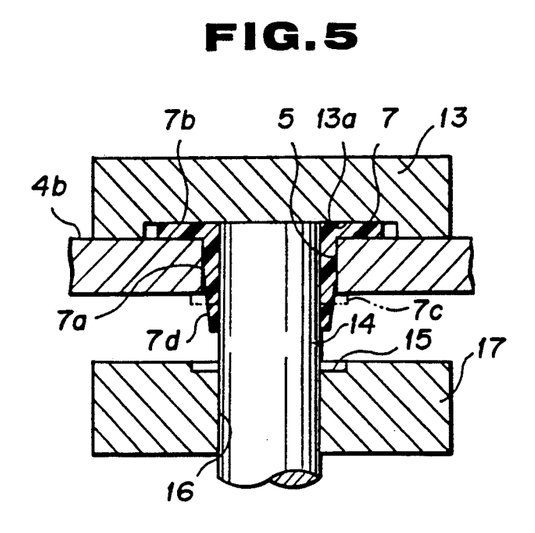
FIG. 5 is a sectional, but partial view, of a press machine in a condition wherein the bush of the first embodiment is being pressed by the machine.

FIG. 5 shows the method for installing the bush 7 to the bore 5 of each horizontal part 4b of the movable wing member 4. For carrying out this method, a press machine is used, which comprises upper and lower press dies 13 and 17. The press die 13 is provided with a guide shaft 14 which extends perpendicularly from a recessed part of the upper press die 13. The recess of the die 13 is denoted by numeral 13a. The lower press die 17 is formed with an annular shallow recess 15 and a center bore 16.

First, an untreated bush 7 is inserted into the bore 5 of the corresponding horizontal part 4b of the movable wing member 4. (If, as is shown, the tubular part 7a of the bush 7 is tapered toward its free end, the insertion of the bush 7 into the bore 5 is very faciliated.) Thereafter, the upper press die 13 is placed on the horizontal part 4b having the guide shaft 14 thereof slidably inserted into the bush 7. Then, the lower press die 17 is raised while slidably receiving the guide shaft 14 in the center bore 16 thereof. Finally, the lower press die 17 is strongly pressed against the horizontal part 4b keeping the upper press die 13 on the horizontal part 4b.

With this strong pressing, the leading end portion of the tubular part 7a of the bush 7 is plastically deformed to produce the smaller flange 7c (which is illustrated by a phantom line in FIG. 5) and at the same time, the tubular part 7a is somewhat swelled to achieve a tight engagement with the cylindrical wall of the bore 5. Thus, as has been mentioned hereinabove, rotation of the bush 7 relative to the bore 5 is suppressed.

Figure 6:
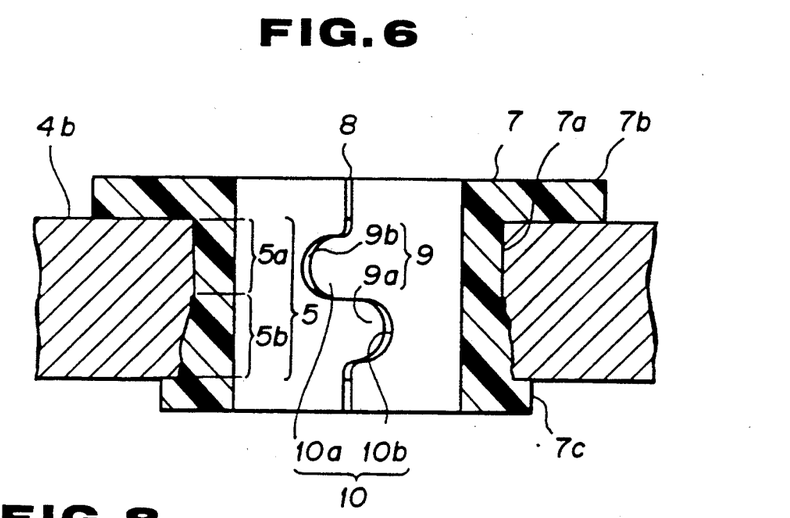
FIG. 6 is a sectional, but enlarged, view of the bush installed in the right position.
Figure 7:
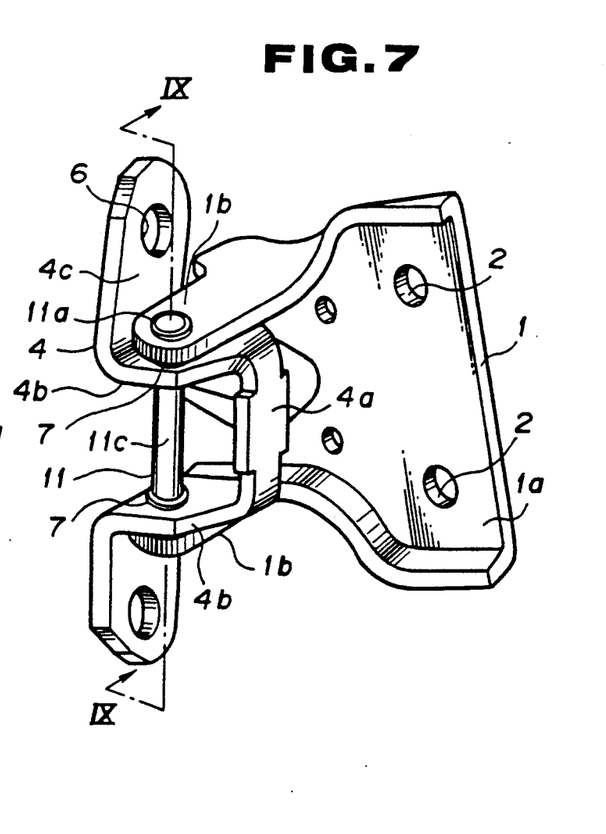
FIG. 7 is a view similar to FIG. 1, but showing a second embodiment of the present invention.

The tight engagement of the bush 7 to the bore 5 will be well understood from FIG. 6. That is, when a bore 5 is provided by using a stamping machine, there are usually produced both a smoothly cut surface 5a and a roughly cut surface 5b. However, as is understood from the drawing, the swell of the tubular part 7a due to the pressing achieves the tight and intimate engagement between the tubular part 7a and the cylindrical wall of the bore 5.

Figure 3:
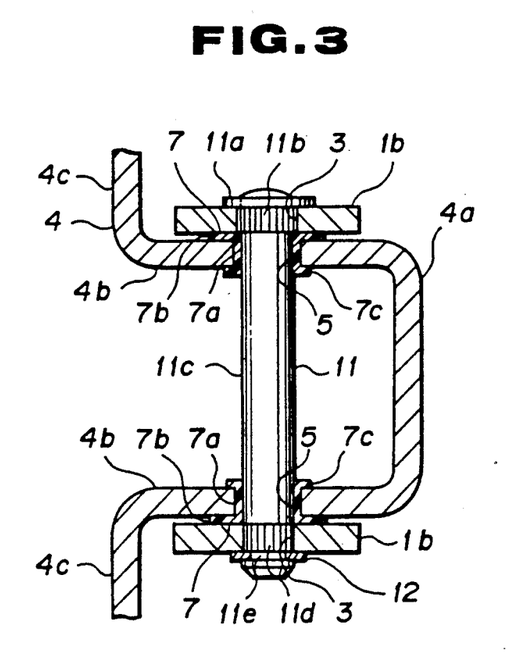
FIG. 3 is a sectional, but enlarged, view taken along the line III—III of FIG. 1.

For pivotally connecting the movable wing member 4 to the fixed wing member 1, a pivot shaft 11 is used, which, as is seen from FIG. 3, comprises an enlarged head part 11a, an upper serrated part 11b, a cylindrical major part 11c, a lower serrated part 11d and a grooved lower part. The groove of the lower part is denoted by numeral 11e.

As is understood from FIGS. 1 and 3, for assembling the door hinge assembly, the protruded middle portion (4a, 4b, 4b) of the movable wing member 4 is put between the upper and lower supporting arms 1b and 1b of the fixed wing membert 1 in such a manner that the bores of the bushes 7 and 7 (which have been tightly installed in the bores 5 and 5 of the movable wing member 4) become aligned with the aligned bores 3 and 3 of the supporting arms 1b and 1b. The pivot shaft 11 is then inserted into the aligned bores of the supporting arms 1b and 1b and those of the bushes 7 and 7. Then, the snap ring 12 is fitted to the groove 11e of the pivot shaft 11.

As is seen from FIG. 3, upon proper assembly, each bush 7 is tightly installed in the corresponding bore 5 of the movable wing member 4 having the corresponding horizontal part 4b tightly sandwiched between the larger and smaller flange parts 7b and 7c thereof, the enlarged head part 11a of the pivot shaft 11 contacts the upper surface of the upper supporting arm 1b, the larger flange part 7b of each bush 7 is sandwiched between the corresponding supporting arm 1b and the corresponding horizontal part 4b, the serrated parts 11b and 11d of the pivot shaft 11 are tightly engaged with the cylindrical walls of the bores 3 and 3 of the supporting arms 1b and 1b, and the cylindrical major part 11c of the pivot shaft 11 is rotatably received in the tubular portions 7a and 7a of the upper and lower bushes 7 and 7.

Since the serrated parts 11b and 11d of the pivot shaft 11 are tightly engaged with the bores 3 and 3 of the upper and lower supporting arms 1b and 1b of the fixed wing member 1, there is no rotation of the pivot shaft 11 relative to the fixed wing member 1. Furthermore, since the swelled tubular part 7a of each bush 7 is tightly engaged with the bore 5, there is no rotation of the bush 7 relative to the movable wing member 4.

Thus, when the movable wing member 4 is subjected to movement relative to the fixed wing member 1, the relative rotation takes place only between the cylindrical wall of the bore of each bush 7 and the cylindrical surface of the pivot shaft 11 and between the outer surface of the larger flange part 7b of each bush 7 and the inner surface of the corresponding supporting arm 1b.

Referring to FIGS. 7 to 10, there is shown a door hinge assembly of a second embodiment of the present invention.

Since the second embodiment is similar in construction to the above-mentioned first embodiment, only the parts which are different from those of the first embodiment will be described in the following. The similar and identical parts are denoted by the same numerals as those in the first embodiment.

Figure 8:
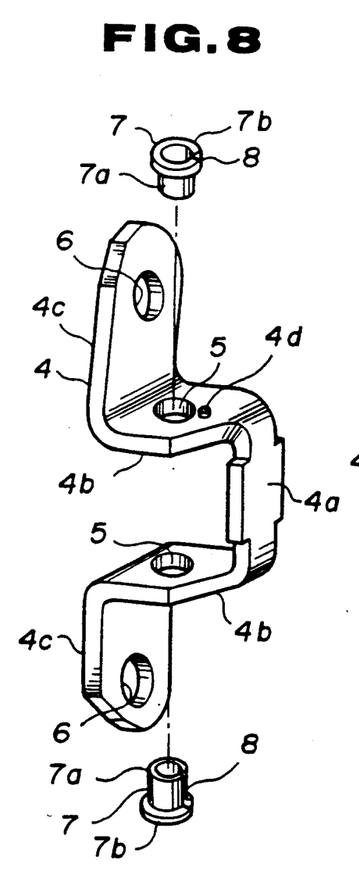
FIG. 8 is a view similar to FIG. 2, but showing the second embodiment.
Figure 9:
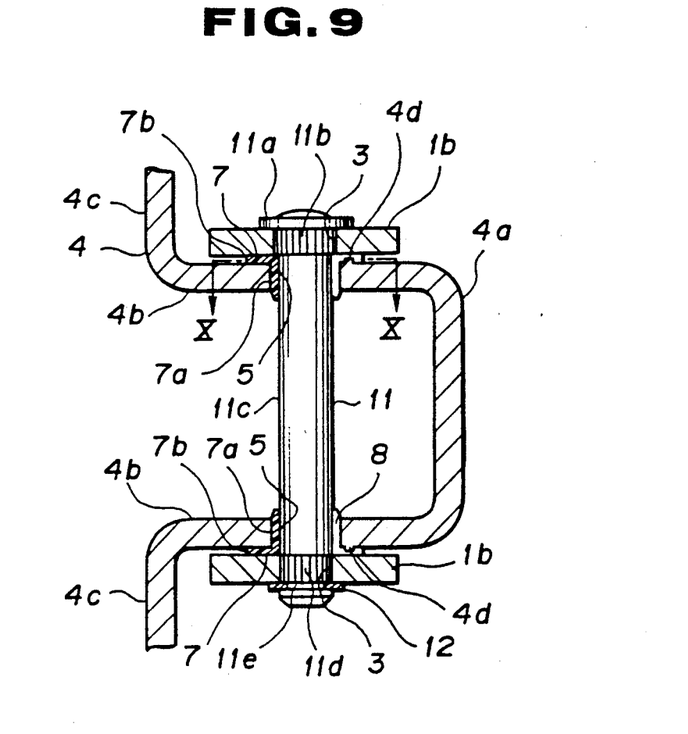
FIG. 9 is a view similar to FIG. 3, but showing the second embodiment, which view is taken along the line IX—IX of FIG. 7.

As is understood from FIGS. 8 and 9, in the second embodiment, the upper and lower horizontal parts 4b and 4b of the movable wing member 4 are provided at their outer surfaces with small stopper pins 4d and 4d, each being located near the corresponding bore 5, as shown.

Each bush 7 employed in this second embodiment is somewhat different from that of the first embodiment. That is, as is seen from FIG. 8, the slit 8 of the bush 7 is made straight. As is seen from FIG. 10, the slit 8 of the bush 7 formed in the flange part 7b has a sectoral cross section which becomes enlarged as it nears the outside.

Figure 10:
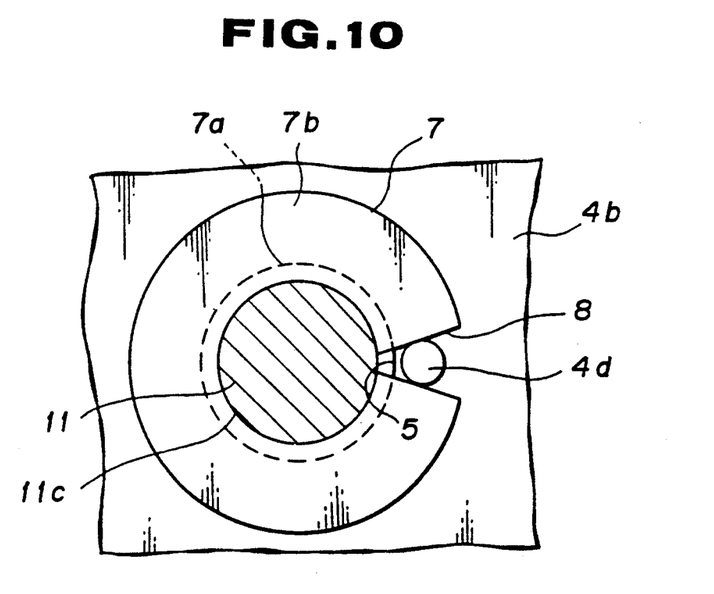
FIG. 10 is a sectional, but enlarged, view taken along the line X—X of FIG. 9.

As shown in FIG. 10, upon proper assembly, the sectoral slit 8 of the flange part 7b of the bush 7 has the corresponding stopper pin 4d latchingly engaged therewith, so that the bush 7 is assuredly prevented from making rotation relative to the horizontal part 4b. It is to be noted that the length of the stopper pin 4d is smaller than the thickness of the flange part 7b of the bush 7.

As will be understood from the above-description, in this second embodiment, the pressing work for providing the tubular part 7a of the bush 7 with a smaller flange part (7c, see FIG. 3) and for achieving the tight engagement between the tubular part 7a and the cylindrical wall of the bore 5 is not necessary because of provision of the latching engagement between the slit 8 and the stopper pin 4d.

Figure 11:
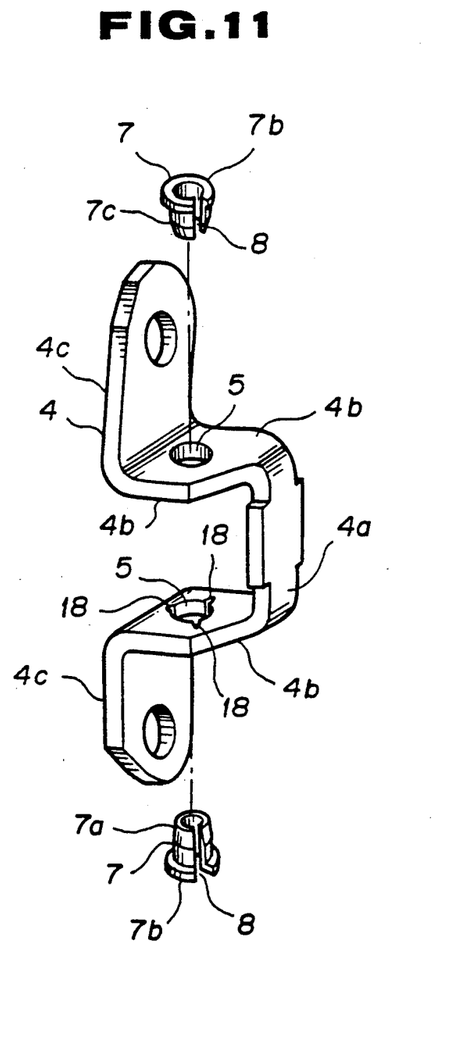
FIG. 11 is a view similar to FIG. 2, but showing a third embodiment.
Figure 12:
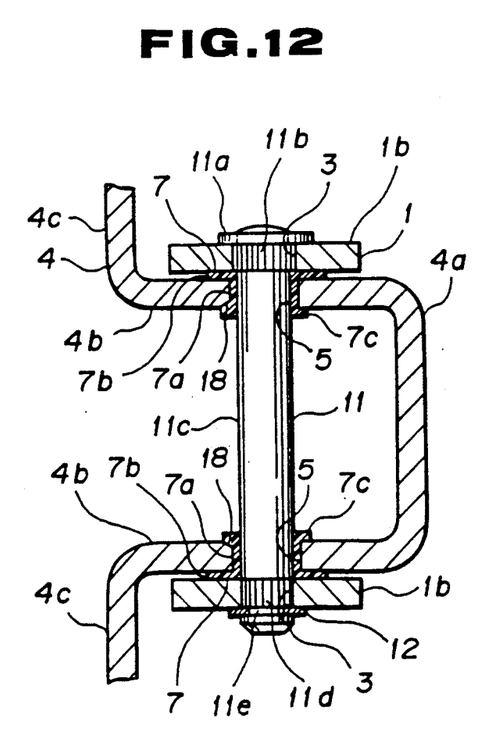
FIG. 12 is a view similar to FIG. 3, but showing the third embodiment.

Referring to FIGS. 11 and 12, there is shown a door hinge assembly of a third embodiment of the present invention.

In the third embodiment, only the means for suppressing the rotation of each bush 7 relative to the bore 5 of the movable wing member 4 differs from that (viz., the stopper pins 4d and 4d) of the second embodiment. Thus, only the means will be described in the following.

That is, as is understood from FIG. 11, in the third embodiment, the upper and lower horizontal parts 4b and 4b of the movable wing member 4 are respectively formed at their inner surfaces with three radially outwardly extending notches 18. As shown, each notch 18 extends from the corresponding bore 5 and the depth of the same is gradually reduced as it goes radially outwardly.

As shown in FIG. 12, upon assembly, the notches 18 receive a part of the bush 7 to achieve a so-called "latching engagement" therebetween. This latching engagement is made by plastically deforming the tubular part 7a of the bush 7, like in the case of the above-mentioned first embodiment. Thus, each bush 7 has a smaller flange part 7c which contacts the inner surface of the corresponding horizontal part 4b.

Due to the latching engagment thus provided, the tight engagement of each bush 7 relative to the bore 5 of the movable wing member 4 is much assured.

In the following, advantages of the present invention will be described.

First, since the bushes 7 and 7 are unmovably and stably received in the bores 5 and 5 of the movable wing member 4, undesired play of the bushes 7 and 7 is suppressed. This induces a reliable operation of the door hinge assembly and a life prolongation of the same.

Second, since the relative rotation takes place only between the limited portions as described hereinabove, the pivotal movement of the movable wing member 4 relative to the fixed wing member 1 is assuredly and reliably carried out without generating any play and noises.

Third, since the door hinge assembly of the invention is simple in construction, the same can be easily massproduced by means of automation with a reduced cost.

What is claimed is:

1. A method for installing a plastically deformable bush in a bore formed in one wing member of a door hinge assembly, said bush including a tubular part which has an end portion tapered toward its free end, and a flange part which is integrally formed on the other end of the tubular part, the tubular part and the flange part having a slit which extends axially therethroughout thereby to provide the bush with circumferentially opposed terminal end portions, said method comprising the steps of:
 (a) inserting the tubular part of said bush into said bore from one side of the wing member until the tapered end portion of the tubular part is exposed to the outside of the bore from the other side of the wing member;

(b) holding the bush in such a manner that the flange part is in intimate contact with one side surface of the wing member; and (c) pressing the tapered end portion of the tubular part toward the flange part to plastically deform the same thereby to produce another flange part on the tubular part, said another flange part being in intimate contact with the other side surface of the wing member.

2. A door hinge assembly for pivotally connecting a door to a fixed structure, comprising:

a first wing member adapted to be secured to one of the door and the fixed structure, said first wing member having first aligned bores formed therethrough;

a second wing member adapted to be secured to the other one of the door and the fixed structure, said second wing member having second aligned bores formed therethrough, said first and second wing members being so assembled that all of the first and second aligned bores are aligned;

a pivot shaft passing through the aligned first and second bores to pivotally connect the first and second wing members;

plastically deformable bushes respectively disposed in the second bores while rotatably receiving therein said pivot shaft, each bush including a tubular part intimately and tightly received in the second bore, and a first flange part integrally formed on one end of said tubular part and intimately contacting with one surface of said second wing member, said bush having a slit which extends axially throughout the tubular and flange parts thereby to provide the bush with circumferentially opposed terminal end portions;

first means for suppressing rotation of said pivot shaft relative to the first bores; and second means for suppressing rotation of said bushes relative to the second bores, said second means including a swelled portion of said tubular part of said bush, said swelled portion being produced by plastically deforming said tubular part.

3. A door hinge assembly as claimed in claim 2, in which said second means further comprises a second flange part formed on said tubular part of said bush, said second flange part intimately contacting with the other surface of said second wing member.

4. A door hinge assembly as claimed in claim 3, in which said second flange part is produced by plastically deforming said tubular part.

5. A door hinge assembly as claimed in claim 3, in which, said first means comprises serrated parts integrally formed on said pivot shaft, said serrated parts being tightly engaged with cylindrical walls of said first bores.

6. A door hinge assembly as claimed in claim 5, in which said second means further comprises:

means defining notches in one surface of said second wing member near said second bores; and a swelled portion of said tubular part of said bush, which is received in said notches to achieve a latching engagement therebetween, said swelled portion being produced by plastically deforming said tubular part.

7. A door hinge assembly as claimed in claim 5, in which the cylindrical wall of the bore of each bush is smoothed to achieve a smooth rotation of said pivot shaft relative thereto.

8. A door hinge assembly as claimed in claim 2, in which said second means comprises a stopper pin integrally formed on said second wing member, said stopper pin being engaged with said slit of said bush to achieve a latching engagement therebetween.

9. A door hinge assembly as claimed in claim 8, in which said first means comprises serrated parts which are integrally formed on said pivot shaft, said serrated parts being tightly engaged with cylindrical walls of said first bores.

10. A door hinge assembly as claimed in claim 8, in which the cylindrical wall of the bore of each bush is smoothed to achieve a smooth rotation of said pivot shaft relative thereto.

11. A door hinge assembly as claimed in claim 2, in which each bush is produced by stamping a plastically deformable sheet which comprises an expanded metal mesh and a plastic which fills up the meshes of said metal mesh.

12. A door hinge assembly as claimed in claim 11, in which said circumferentially opposed terminal end portions of said bush are formed with mutually engageable wave-like portions, each including a rounded convex portion and a rounded concave portion.

13. A door hinge assembly as claimed in claim 12, in which, when kept unstressed, said bush assumes its expanded state separating said opposed terminal end portions from each other, while, when stressed from the outside, the bush completes its cylindrical shape having said opposed terminal end portions neatly mated.

14. A plastically deformable bush for use in a door hinge assembly, comprising:

a tubular part which has an end portion tapered toward its free end;

a circular flange part integrally and coaxially formed on the other end of said tubular part; and means defining a crooked slit which extends substantially axially throughout the tubular and flange parts thereby to provide the bush with circumferentially opposed terminal end portions which are formed with mutually engageable wave-like portions, each including a rounded portion and a rounded recess, said bush being produced by stamping a sheet which comprises a metal mesh and a plastic filling up the meshes of said metal mesh.

15. A plastically deformable bush as claimed in claim 14, in which said circumferentially opposed terminal end portions of said bush are formed with mutually engageable wave-like portions, each including a rounded projection and a rounded recess.

16. A plastically deformable bush as claimed in claim 14, in which said slit of said bush is made straight.

17. A door hinge assembly as claimed in claim 2, in which each bush is produced by stamping a plastically deformable sheet which comprises a metal mesh and a plastic which fills up the meshes of said metal mesh.

18. A door hinge assembly for pivotally connecting a door to a fixed structure, comprising:

a first wing member adapted to be secured to one of the door and the fixed structure, said first wing member having first aligned bores formed therethrough;

a second wing member adapted to be secured to the other one of the door and the fixed structure, said second wing member having second aligned bores formed therethrough, said first and second wing members being so assembled that all of the first and second aligned bores are aligned;

a pivot shaft passing through the aligned first and second bores to pivotally connect the first and second wing members;

plastically deformable bushes respectively disposed in the second bores while rotatably receiving therein said pivot shaft, each bush including a tubular part intimately and tightly received in the second bore, and a first flange part integrally formed on one end of said tubular part and intimately contacting with one surface of said second wing member, said bush having a slit which extends axially throughout the tubular and flange parts thereby to provide the bush with circumferentially opposed terminal end portions;

first means for suppressing rotation of said pivot shaft relative to the first bores; and second means for suppressing rotation of said bushes relative to the second bores, said second means comprising a stopper pin integrally formed on said second wing member, said stopper pin being engaged with said slit of said bush to achieve a latching engagement therebetween.

19. A door hinge assembly for pivotally connecting a door to fixed structure, comprising:

a first wing member adapted to be secured to one of the door and the fixed structure, said first wing member having first aligned bores formed therethrough;

a second wing member adapted to be secured to the other one of the door and the fixed structure, said second wing member having second aligned bores formed therethrough, said first and second wing members being so assembled that all of the first and second aligned bores are aligned;

a pivot shaft passing through the aligned first and second bores to pivotally connect the first and second wing members;

plastically deformable bushes respectively disposed in the second bores while rotatably receiving therein said pivot shaft, each bush including a tubular part intimately and tightly received in the second bore, and a first flange part integrally formed on one end of said tubular part and intimately contacting with one surface of said second wing member, said bush having a slit which extends axially throughout the tubular and flange parts thereby to provide the bush with circumferentially opposed terminal end portions;

first means for suppressing rotation of said pivot shaft relative to the first bores;

second means for suppressing rotation of said bushes relative to the second bores; and in which each bush is produced by stamping a plastically deformable sheet which comprises an expanded metal mesh and a plastic which fills up the meshes of said metal mesh.

20. A door hinge assembly for pivotally connecting a door to a fixed structure, comprising:

a first wing member adapted to be secured to one of the door and the fixed structure, said first wing member having first aligned bores formed therethrough;

a second wing member adapted to be secured to the other one of the door and the fixed structure, said second wing member having second aligned bores formed therethrough, said first and second wing members being so assembled that all of the first and second aligned bores are aligned;

a pivot shaft passing through the aligned first and second bores to pivotally connect the first and second wing members;

plastically deformable bushes respectively disposed in the second bores while rotatably receiving therein said pivot shaft, each bush including a tubular part intimately and tightly received in the second bore, and a first flange part integrally formed on one end of said tubular part and intimately contacting with one surface of said second wing member, said bush having a slit which extends axially throughout the tubular and flange parts thereby to provide the bush with circumferentially opposed terminal end portions;

first means for suppressing rotation of said pivot shaft relative to the first bores;

second means for suppressing rotation of said bushes relative to the second bores; and in which each bush is produced by stamping a plastically deformable sheet which comprises a metal mesh and a plastic which fills up the meshes of said metal mesh.

* * * * *